Dec. 9, 1941.    A. W. BARNLEY    2,265,621
MACHINE FOR MARKING HARD TENNIS COURTS
Filed Aug. 9, 1939    2 Sheets-Sheet 2

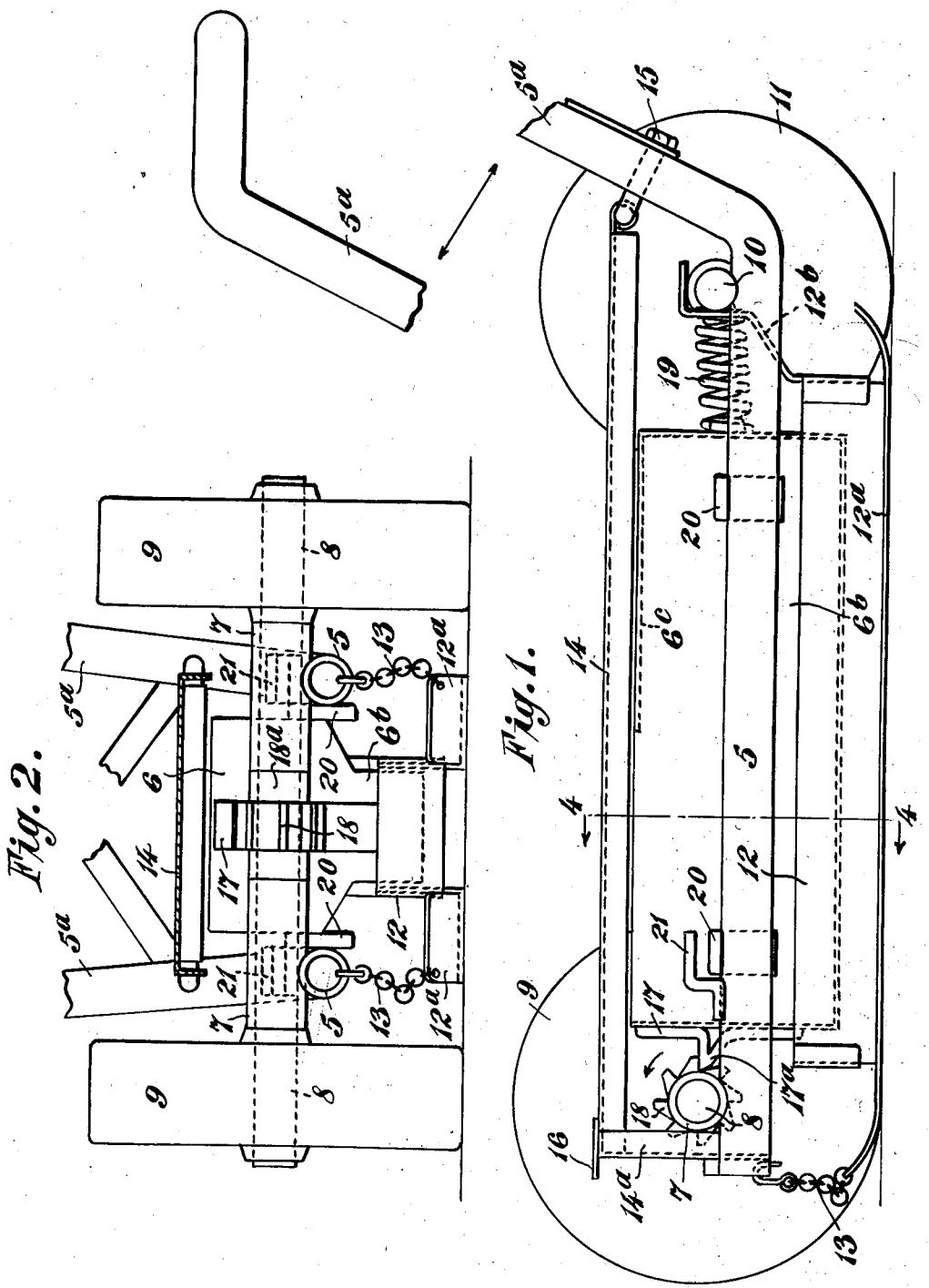

Arthur Wynne Barnley
Inventor
By Marshall & Marshall
Attorneys

Patented Dec. 9, 1941

2,265,621

UNITED STATES PATENT OFFICE 2,265,621

MACHINE FOR MARKING HARD TENNIS COURTS

Arthur Wynne Barnley, Thika, Kenya Colony, British East Africa

Application August 9, 1939, Serial No. 289,190

4 Claims. (Cl. 275—2)

This invention relates to an improvement in machines for marking hard tennis courts, and has for its primary object to provide a machine for mechanically marking by means of a dry powdered substance a line on the surface of the court.

The preferred means of carrying the invention into effect will now be described with particular reference to the accompanying sheets of drawings in which similar reference numerals indicate similar parts in the several views.

Fig. 1 is a side elevation of the machine with the near side wheels removed from their axles, so as to afford a clearer illustration of certain features of the invention.

Fig. 2 is a front elevation partly in section viewed from the left-hand side of Fig. 1.

Figure 3:
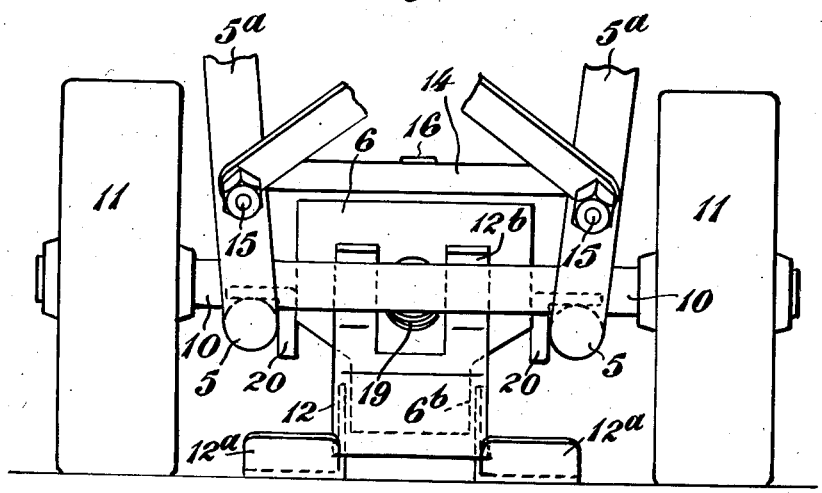
Fig. 3 is a rear end elevation.
Figure 4:
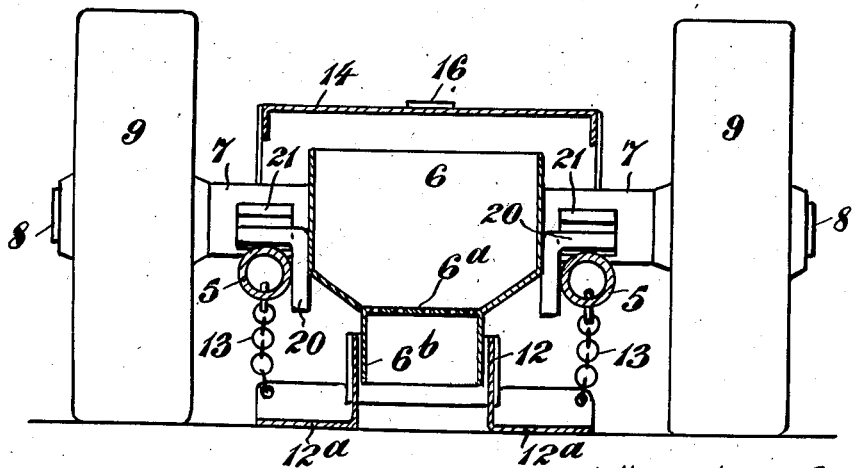
Fig. 4 is a cross-section on line 4—4 of Fig. 1.

The machine comprises a tubular framework 5 adapted to embrace a hopper 6 which contains the dry powdered lime or other dry deposit from which the lines are to be produced. The tubular frame extends rearwardly to constitute tubular handles 5ª by means of which the machine can be propelled. Welded to each of the two side tubular members of the frame 5 is a sleeve 7 which sleeves constitute the bearings for a rotatable axle 8 to which is fixedly secured a front pair of wheels 9. The rear section of the horizontal runs of the tubular frame 5 has welded or otherwise fixed thereto a rear axle 10 on which are freely mounted a rear pair of wheels 11, it being appreciated that the two pairs of wheels 9 and 11 respectively constitute the support for the machine. The hopper 6 which is disposed between the two tubular side members of the frame 5 is provided with a perforated grid plate 6ª, through which the powdered lime or other dry substance is delivered as will be hereinafter described. Below the grid plate 6ª there is provided a channel 6ᵇ constituting a downward extension of the sides of the hopper 6. Freely surrounding this channel 6ᵇ is an open rectangular framework 12 comprising four vertical sides, which sides are provided at their lower edges with laterally extending horizontal surface bearing flanges 12ª, and it will be appreciated that the lines formed by the meeting edges of the side walls of the framework 12 and the horizontal flanges 12ª are the bounding or determining side lines between which the powder is delivered to or deposited on the surface. The flanged sections 12ª extend upwardly at their front and rear ends as clearly seen in Fig. 1 somewhat in the form of a sleigh, the front extension being linked to the framework 5 by means of hook and chain links 13, while the rear end of the said framework 12 is provided with an upward extension in the form of a cranked plate 12ᵇ which is forked as seen in Fig. 3, the forked extensions having an abutting contact with the periphery of the fixed axle 10. The top of the hopper may be partially enclosed by means of a cover plate 6ᶜ to prevent dispersement of the contents of the hopper due to wind or other factor. There is also provided above the hopper a flanged cover plate 14 which is hingedly connected by means of a clamping bolt 15 to the handle section 5ª of the framework, the front extremity of the cover plate 14 being provided with a downwardly extending lip 14ª, the lower end of which rests on the pair of tubular members of the frame 5. Secured to the upper surface of the flanged cover plate 14 is an index pointer 16 disposed on the longitudinal centre line of the cover which serves as a guide pointer for the operator.

In order to provide the necessary agitation to the contents of the hopper 6 to ensure a delivery of the powdered lime or other substance through the grid plate 6ª on to the surface of the court as determined by the bounding lines formed by the side walls 12 and the horizontal flanges 12ª, it is desirable to give a vibratory motion to the hopper 6. This motion is preferably a combined reciprocating motion in a horizontal plane and a lifting and lowering motion in a vertical plane. This vibratory motion is accomplished by mounting on the front wall of the hopper 6 a bracket 17 which incorporates what may be termed a pawl extension 17ª. This extension 17ª is disposed in the path of the teeth of a ratchet wheel 18 fixedly mounted by means of a sleeve 18ª on the rotatable front axle 8. The rear wall of the hopper 6 at a point immediately behind the said ratchet wheel 18 and pawl extension 17ª is provided with a helical compression spring 19, the front turn of this spring surrounding a stud secured to the rear wall of the hopper 6, while the rear turn of the spring 19 abuts against the fixed rear axle 10, a similar locating stud being provided.

Mounted on each side of the side walls of the hopper 6 are pairs of angle brackets 20, the horizontal flanges whereof serve to support the hopper on the tubular side members of the frame 5. Disposed above the front pair of angle brackets 20 and secured to the said tubular framework 5 are a pair of Z-shaped brackets 21, the upper horizontal flanges whereof serve as limiting stops for the lifting motion of the hopper 6.

When the machine is propelled forwardly on the four wheels, the ratchet wheel 18 is caused to rotate in the direction indicated by the arrow in Fig. 1. This rotation effects a horizontal displacement of the hopper against the resistance of the spring 19 due to the pressure exerted by the teeth of the ratchet wheel on the pawl extension 17a, thereby effecting a reciprocal motion of the hopper in a horizontal direction. At the same time a lifting or tilting motion in a vertical plane is imparted to the hopper by the lifting contact of the teeth under the pawl extension 17a, which lifting motion is limited by the Z-shaped bracket stops 21.

It is found in practice that this dual agitation of the hopper 6 is sufficient to cause an effective delivery or deposit of a dry powdered substance such as lime in requisite quantities through the fine perforations in the grid plate 6a, and to ensure a defined line within the side bounding limits determined as aforesaid by the freely mounted surrounding framework 12, 12a.

It will be appreciated that the relatively free or loose mounting of the surrounding framework 12, 12a, admits of a conformity to the surface of the court being marked and that the necessary forward propulsion of this framework is ensured by the abutting contact of the forked bracket 12b with the rear axle 10.

It will further be appreciated that when it is desired to cease marking i. e. to stop delivery of the material contained within the hopper 6, that if the machine is tilted or rocked on the rear pair of wheels 11 so as to raise the front pair of wheels 9 from contact with the ground surface, agitation of the hopper 6 ceases and further delivery of the contents does not take place until the machine is again lowered on to its four wheels.

I claim:

1. A machine for marking hard tennis courts, comprising in combination a tubular supporting framework incorporating a handle, two pairs of wheels connected to said framework, one pair being mounted on a fixed axle and the other pair being mounted on a rotatable axle, a hopper freely mounted on said framework, a grid plate incorporated in said hopper, a delivery channel disposed below said grid plate, a bracket mounted on one wall of said hopper having a pawl extension formed thereon, a spring interposed between the opposite wall of the said hopper and the fixed axle, a ratchet wheel secured to the rotatable axle the teeth of which co-operate with the said pawl extension on the bracket to effect a vibratory motion of the said hopper, and a framework freely surrounding the lower part of the said delivery channel adapted to define the width of the deposit of material from the hopper, said surrounding framework being linked to the tubular framework so as to admit of a free vertical motion thereof about the said delivery channel.

2. A machine for marking hard tennis courts, comprising in combination a tubular supporting framework incorporating a handle, two pairs of wheels connected to said framework, one pair being mounted on a fixed axle and the other pair being mounted on a rotatable axle, a hopper freely mounted on said framework, a grid plate incorporated in said hopper, a delivery channel disposed below said grid plate, a bracket mounted on one wall of said hopper having a pawl extension formed thereon, a spring interposed between the opposite wall of the said hopper and the fixed axle, a ratchet wheel secured to the rotatable axle the teeth of which co-operate with the pawl extension of the bracket to effect a vibratory motion of the said hopper in a horizontal plane and a lifting motion of the said hopper in a vertical plane, a framework freely surrounding the lower part of the said delivery channel adapted to define the width of the deposit of material from the hopper, said surrounding framework being linked to the framework so as to admit of a free vertical motion thereof about the said delivery channel, and means for limiting the vertical lifting of the said hopper.

3. A machine for marking hard tennis courts, comprising in combination a tubular framework incorporating a handle, a plurality of wheels supporting said framework, a hopper that is provided with a perforated grid plate outlet and is freely supported on said framework, a ratchet and pawl mechanism associated with a coil compression spring for imparting a vibratory motion to said hopper in a horizontal plane and also for imparting a lifting motion to said hopper in a vertical plane, means for limiting the said lifting motion, a flanged open framework freely surrounding the lower part of said delivery channel and having contact with the ground surface, said framework being adapted to define the width of the deposit of material from said hopper, and means for freely connecting the said open framework to the tubular framework whereby the surrounding open framework is adapted to adjust itself relative to said hopper and tubular framework.

4. An apparatus of the class described, comprising in combination a frame having a plurality of wheels, a hopper for holding powdered material movably supported on the frame, a spring urging the hopper in a horizontal direction, means for periodically lifting the hopper while moving it horizontally to compress said spring, and then releasing the hopper to fall under the action of gravity while returning horizontally under the action of said spring, thereby simultaneously vibrating the hopper vertically and reciprocating the hopper horizontally, and means for defining the width of the strip of powdered material deposited from the hopper.

ARTHUR WYNNE BARNLEY.